US008244921B2

United States Patent
Huster et al.

(10) Patent No.: US 8,244,921 B2
(45) Date of Patent: Aug. 14, 2012

(54) APPARATUS FOR PROVIDING A USER INTERFACE, PERIPHERAL DEVICES, COMPUTER MEANS, METHODS OF PROVIDING A USER INTERFACE, AND PROGRAMS

(75) Inventors: Karsten Huster, Bad Iburg (DE); Michael Rosemann, Bad Iburg (DE)

(73) Assignee: Canon Europa N.V., Amstelveen (NL)

( * ) Notice: Subject to any disclaimer, the term of this patent is extended or adjusted under 35 U.S.C. 154(b) by 168 days.

(21) Appl. No.: 12/105,085

(22) Filed: Apr. 17, 2008

(65) Prior Publication Data
US 2008/0263229 A1 Oct. 23, 2008

(30) Foreign Application Priority Data

Apr. 18, 2007 (GB) .................................. 0707496.6

(51) Int. Cl.
*G06F 3/00* (2006.01)
(52) U.S. Cl. ............................................................ 710/8
(58) Field of Classification Search ........................ None
See application file for complete search history.

(56) References Cited

U.S. PATENT DOCUMENTS

| 5,887,193 A * | 3/1999 | Takahashi et al. ................ 710/8 |
| 5,937,150 A * | 8/1999 | Phan .................................. 710/8 |
| 6,166,734 A | 12/2000 | Nahi et al. |
| 6,292,271 B1 * | 9/2001 | Phan .............................. 358/440 |
| 6,571,293 B1 * | 5/2003 | Hong ............................. 709/232 |
| 7,131,122 B1 * | 10/2006 | Lakhdhir ...................... 717/168 |
| 7,325,203 B2 * | 1/2008 | Katano ......................... 715/765 |
| 7,698,321 B2 * | 4/2010 | Hackworth ................... 707/689 |
| 2002/0091732 A1 * | 7/2002 | Pedro ............................ 707/505 |
| 2003/0011633 A1 | 1/2003 | Conley et al. |
| 2003/0107588 A1 | 6/2003 | Elsbree et al. |
| 2006/0095436 A1 * | 5/2006 | Abe ................................ 707/10 |

FOREIGN PATENT DOCUMENTS

EP    1069500 A1    1/2001

OTHER PUBLICATIONS

Shiraishi, Yasumasa et al., "Multi-function Technology for FAX / MFP Devices", Aug. 1998, OKI Technical Review, vol. 64, pp. 1-4.*

* cited by examiner

*Primary Examiner* — Eron J Sorrell
*Assistant Examiner* — Dayton Lewis-Taylor
(74) *Attorney, Agent, or Firm* — Canon U.S.A, Inc. IP Division

(57) ABSTRACT

There is provided an apparatus for providing a user interface comprising a peripheral device (1) for displaying a user interface, and computer means (2) connected to the peripheral device (1). The apparatus is configured to provide user-interface information to the peripheral device (1), and the peripheral device (1) is configured to allow a user to interact with a program on the computer means (2) via a user interface displayed on the peripheral device (1). The apparatus is configured so that the computer means (2) sends user-interface information to the peripheral device (1) to allow the peripheral device (1) to display a plurality of panes of the user interface to the user without receiving further user-interface information from the computer means (2).

10 Claims, 5 Drawing Sheets

APPARATUS FOR PROVIDING A USER INTERFACE, PERIPHERAL DEVICES, COMPUTER MEANS, METHODS OF PROVIDING A USER INTERFACE, AND PROGRAMS

BACKGROUND OF THE INVENTION

1. Field of the Invention

The present invention relates to apparatus for providing a user interface, peripheral devices, computer means, methods of providing a user interface, and programs.

2. Description of the Related Art

Peripheral devices such as printers, fax machines, scanners and other devices are commonly provided with user interfaces (UIs) to allow users to input commands, data etc. When such devices are sold to companies and other organisations, there is often a desire for some customisation of the UI to meet the customer's requirements. Such customisation may vary from inclusion of the customer company's logo on panes of the UI to inclusion of different button layout, screen orders or customised fields to be included in panes of the UI. Such customisation can allow the device to more efficiently meet the customer's needs and intended usage requirements.

In many existing devices, the software of the UI is stored in a memory of the device that is to display the UI. Varying the UI therefore involves adjusting the software of the UI. However, varying the software and performing appropriate quality control tests tends to be time consuming, resulting in an undesirably long response time to customisation requests.

US 2003/0011633 discloses a system that dynamically provides a user interface on a Multi-Function Peripheral (MFP). The system includes an MFP and a server configured to provide information to the MFP. The system is arranged such that a first screen to be displayed on an interface of the MFP is sent from the server. As the user interacts with the displayed screen, information is sent back to the server and the server sends further information to the MFP controlling display of different screens and controlling operations of the MFP. Each screen of the interface of the MFP is sent separately by the server in response to user interactions.

FIG. 1 is a schematic diagram showing network traffic according to the apparatus shown in US 2003/0011633. In this diagram the downward pointing arrows designate information received at the MFP from the server and upward pointing arrows designate information sent from the MFP to the server. The passage of time is represented on the horizontal axis with later times being shown toward the right-hand side of the figure. As can be seen from the figure, the MFP regularly receives information from the server and sends information to the server as each page of the user interface is separately transmitted from the server and displayed.

The system described in US 2003/0011633 is flexible in that the screens to be displayed are sent in XML language. However, because a remote server controls the UI in real time, the UI is likely to be slow and is prone to delays due to network traffic.

SUMMARY OF THE INVENTION

It is an object of the present invention to alleviate some of the problems discussed above.

According to a first aspect of the present invention there is provided an apparatus for providing a user interface according to claim 1.

As the UI responds to some user requests based on UI information already received from the computer means without further communication with the computer means, a UI may be provided that is quicker to respond to user interactions. On the other hand, because UI information is received from the server providing information about the appearance of the UI, it is also possible to provide a system in which it is quicker and easier to customise the UI in response to customer demands.

In some embodiments, the peripheral device is configured to send information to the computer means about inputs from a user in the case that a trigger event occurs. Such a trigger event may be, for example, pressing of a "print" button, or a request of information from a list.

Further, the peripheral device may be configured to send information to the computer means according to a synchronous protocol whereby the peripheral device waits for a response from the computer means before responding to at least one trigger event. In some embodiments the peripheral device may be configured to send information to the computer means according to an asynchronous protocol whereby the peripheral device responds to the trigger event before a response is received from the computer means.

The apparatus may be configured so that the computer means sends the peripheral device user-interface information to allow the peripheral device to display a plurality of panes in the case that the computer means determines that the peripheral device does not have a correct user interface loaded. In some cases, the sending of user information to the peripheral device is initiated as a result of a change to the user interface information at the computer means.

BRIEF DESCRIPTION OF THE DRAWINGS

An embodiment of the present invention will now be described, by way of example only, with reference to the accompanying drawings in which.

DESCRIPTION OF THE EMBODIMENTS

Figure 2:
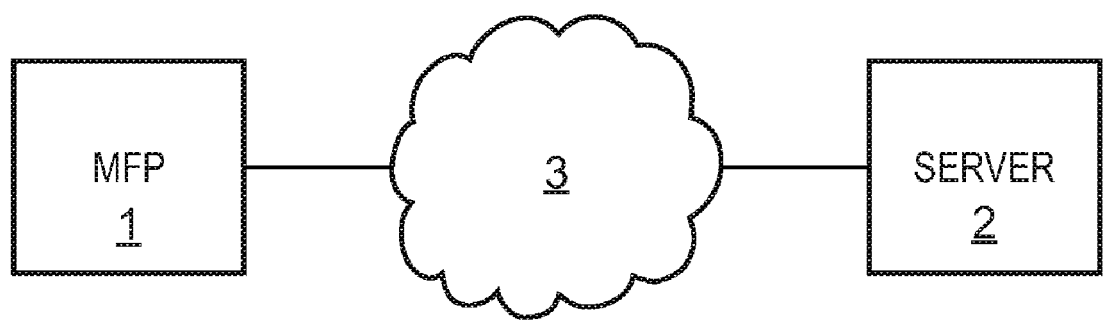
FIG. 2 is a schematic diagram showing an apparatus embodying the present invention.

FIG. 2 shows a Multi-Functional Peripheral (MFP) 1, connected to a server 2 via a network 3.

The server 2 is a conventional server on which is installed print management software that allows management of print jobs on printers. The print management software embodies the present invention. In this embodiment the print management software includes print flow controls that allow previewing of print jobs, setting of printer settings, selection of print media and sending of jobs for printing. Other features of the print management software include user management (print permissions etc.) and pay-per-print expense management to allow printing to be controlled to within certain allocated budgets.

The MFP 1 in this embodiment is a conventional MFP, in particular a Canon MFP, including a display for displaying a user interface (UI). The MFP 1 is provided with a software platform that enables individual applications to be installed and run on the MFP 1. An example of such a software platform is MEAP, a java based application software platform provided on some Canon MFPs that allows installation and running of applications on the MFP 1.

Installed on the software platform of the MFP 1 is a browser application that also embodies the present invention. The browser application, when run on the MFP 1 acts as a browser for the print management software installed on the server 2. The browser application is configured to display panes of the UI based on received UI information.

The print management software and Browser applications are configured to communicate with each other using an XML based UI language. This XML language allows definition of the appearance of panes to be displayed by the browser application, content information for display in fields of the UI panes to be communicated, and allows user inputs to the browser application be sent to the print management software.

Figure 3:
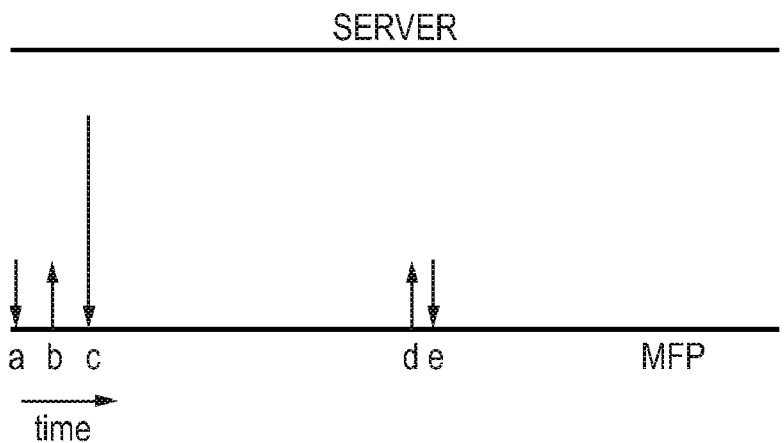
FIG. 3 is a schematic diagram schematically showing network traffic in the apparatus shown in FIG. 2.

Communication between the print management software and the browser application will now be described with reference to FIGS. 3 to 5. FIG. 3 is a diagram showing network traffic between the MFP 1 and server 2. In this diagram the downward pointing arrows designate information received at the MFP 1 from the server 2 and upward pointing arrows designate information sent from the MFP 1 to the server 2. Longer arrows indicate a greater transfer of information. The passage of time is represented on the horizontal axis with later times being shown toward the right-hand side of the figure.

In use the MFP 2 is turned on and the browser application is launched on the MEAP software platform. Meanwhile, the print management software on the server 2 is configured to periodically check for the existence of a browser application on the MFP 1. In the case that, as a result of these checks, the browser application is found, the print management software queries whether a user interface has been loaded in the browser application. This query is shown as "a" in FIG. 3. In the case shown in FIG. 3, the MFP replies that no user interface is loaded in a communication marked "b" in FIG. 3. In response the server sends UI information to the browser application in a communication marked "c" in FIG. 3. In other cases the MFP may reply that a user interface is loaded and send information about the loaded user interface. In particular, an identification number of the user interface is sent. Upon receipt of this identification number, the print management software on the print server 2 checks to see if the UI loaded on the MFP 1 is the correct UI. If it is determined that the correct UI is loaded, no further action is taken by the print server 2. If the print management software determines that an incorrect version of the UI is loaded on the MFP 1, the print server 2 sends UI information as in the case that no UI was loaded on the MFP 1.

The UI information sent by the server 2 includes information about the layout and structure of the plurality of panes of the UI to be displayed by the MFP 1. This information about the structure and appearance of the UI is fixed and, once received at the MFP 1, cannot be varied during run time of the MFP 1. However, an administrator using the print management software on the server 2 may alter the UI information. When completed, such changes to the UI will trigger a download of UI information to the MFP 1, the next time that the print management software queries the browser application because the UI loaded on the MFP 1 will no longer be the correct UI.

Once the information, c, has been received from the server 2, the browser application is launched and displays a first pane. The layout and appearance of the first pane is defined by the UI information received from the server 2.

A user may interact with the UI in a conventional manner. For example, print settings may be entered, or print media may be selected. User interactions with the user interface displayed in the browser application can be handled in one of three ways as will now be explained with reference to FIG. 5.

In step S50 the MFP 1 is turned on and undergoes a start up procedure. In step S51, UI information is received from the server 2 in the XML UI language as a result of a query from the server 2 as described above. Steps S52, S54 and S58 represent different inputs by a user to the UI displayed by the browser application.

In step S52 a user inputs a command that triggers an internal action. Such an input may be a request to display a new pane of the UI, or selection of an entry from a drop down menu in a displayed pane. In the case of such inputs, a response to the input is displayed, S53, based on the UI information already received from the server 2 without communication between the server 2 and MFP 1. Such generated responses are known as internal actions.

Figure 4:
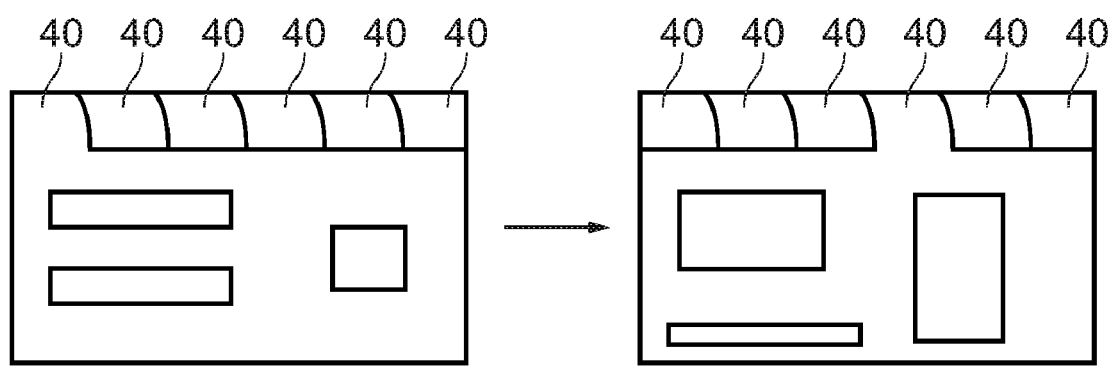
FIG. 4 is a diagram showing panes of a UI of a peripheral device of the apparatus shown in FIG. 2.
Figure 5:
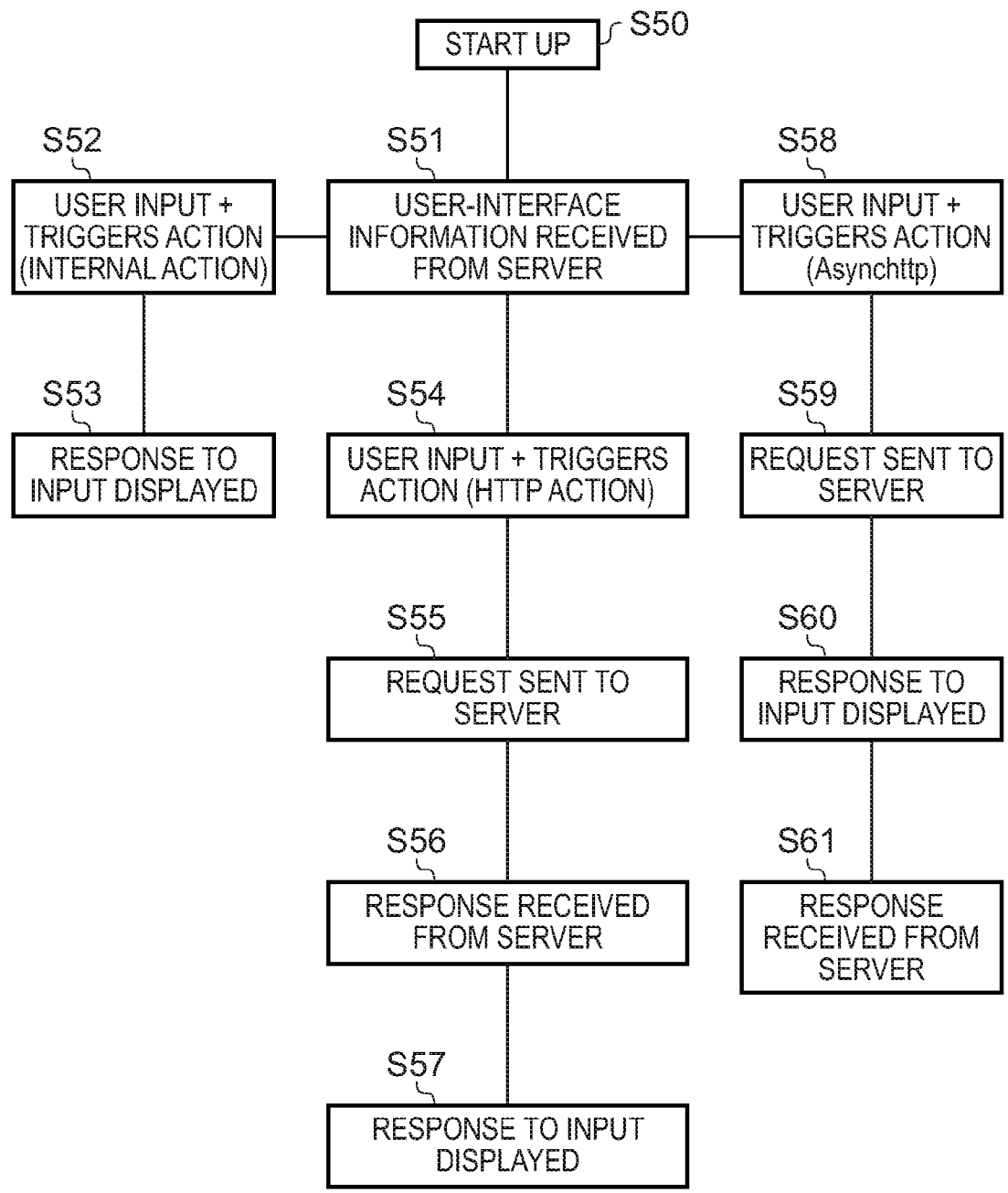
FIG. 5 is a chart that describes operation of the apparatus shown in FIG. 2.

An example of an internal action is shown in FIG. 4 in which one pane of the UI is displayed in place of another pane at a user's request. The user may initiate such a change in display by touching a button 40 displayed on the MFP 1 to select a relevant pane.

In step S54 (shown in FIG. 5) a user inputs a command that triggers a http action. Such an input may be a request for information from the print management software, such as a request for information about the balance of an allocated print budget, a request for user authentication, or a list of jobs stored on the server 2. In the case of such requests, a request is sent to the server 2 indicating requested information, S55. The request is processed by the print management software, and, at step S56, the MFP 1 receives a response from the print server 2 in the form of additional user-interface information in the XML UI language, S56. Once the response is received, the browser displays a new pane including the newly received user-interface information, S57. As mentioned above, the structure and layout of the MFP UI is fixed during run time. Consequently, http requests relate to information to be displayed in fields of panes of the UI.

In step S58, a user inputs a command that triggers an asynchttp action. Such a command might be a request to start printing from a printer other than the MFP 1. In the case of such commands, a request is sent to the server 2 in step S59 and is processed by the print management software. The UI displayed by the browser application is updated, if necessary, based on UI information that has already been received at the MFP 1 in step S60. In step S61 a reply from the server 2 may be received. In the case of asynchttp actions there is no need to wait for a reply from the server 2 before updating the pane displayed by the browser application because the response may be determined from already received UI information.

Looking again at FIG. 3, "d" indicates an http request being sent from the MFP 1. The response from the server is then received a short time later, "e".

Figure 1:
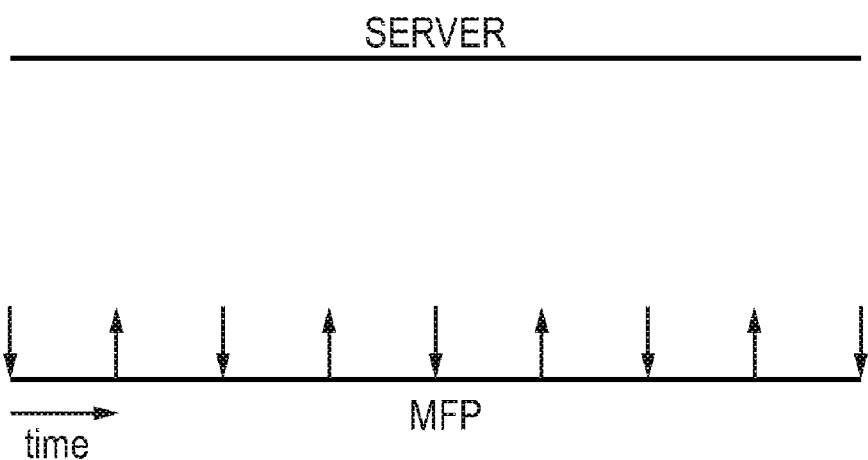
FIG. 1 is a diagram schematically showing network traffic in a prior art system.

Comparing FIGS. 1 and 3 a difference between the device disclosed in US 2003/0011633 and the present embodiment may be appreciated. In the apparatus described above, many fewer communications between the server 2 and the MFP 1 are required. This arises because the MFP 1 receives UI information that allows the MFP 1 to display a plurality of panes and to perform internal actions without communication with the server 2. Further, because information about the structure of the UI is fixed at the MFP 1 during runtime, the quantity of information to be transferred between the server 2 and MFP 1 is reduced. This allows quicker responses to user inputs to be displayed by the browser application on the MFP 1.

By receiving UI information at the MFP 1 in a single initial download, a more acceptable user experience can be provided. The reason for this is that, in general, a user expects to wait for a short period while software on an MFP 1 starts up or a UI is updated. However, subsequent delays when using the browser application to interact with the print management software tend to be unacceptable.

Embodiments of the present invention have been described above in terms of the MFP 1, server 2, apparatus including the MFP 1 and server 2, and programs run on the MFP 1 and server 2. The present invention may also be embodied by a storage medium carrying such programs as is set out in the claims.

Figure 6:
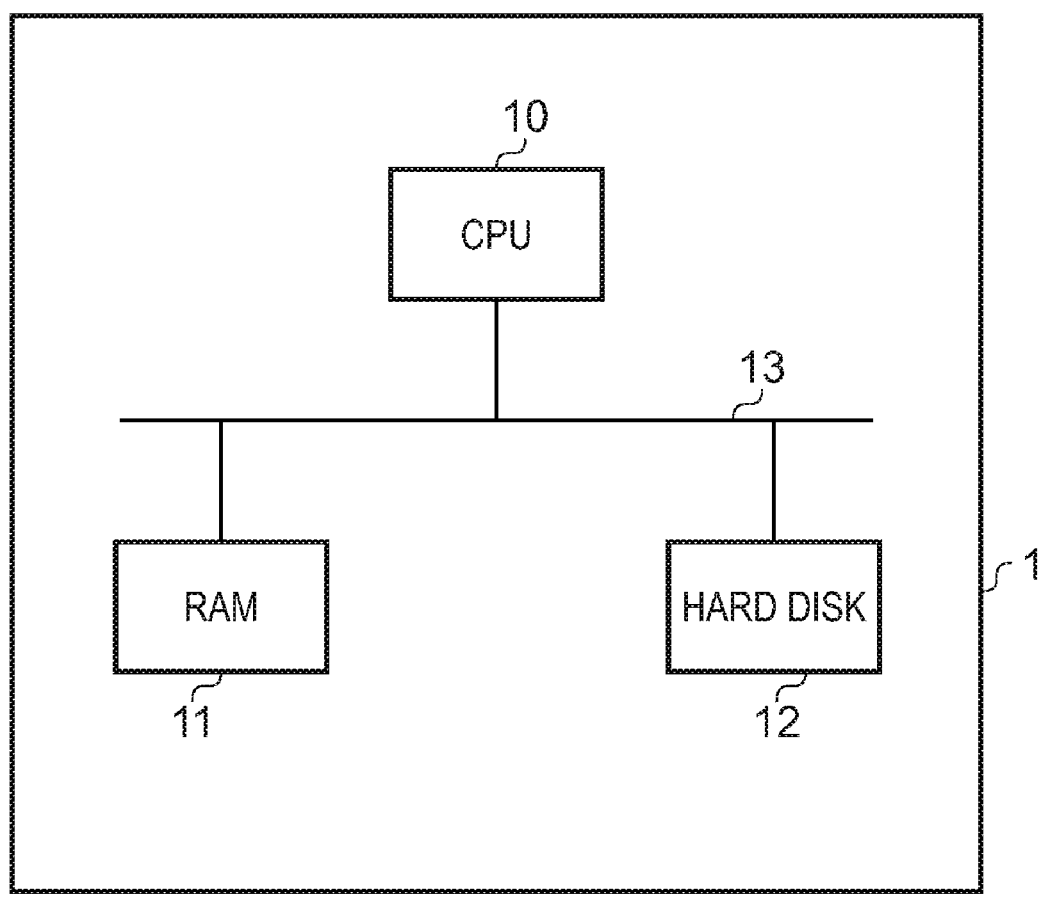
FIG. 6 is a simplified diagram showing processing means in the peripheral device.
Figure 7:
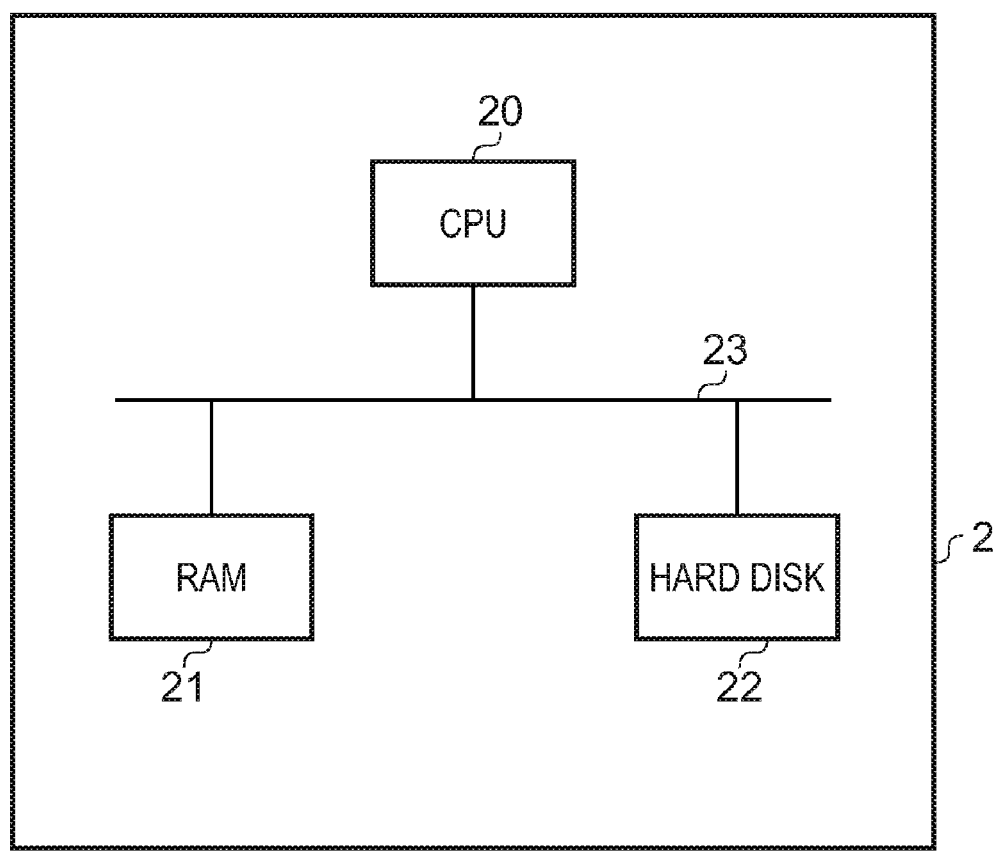
FIG. 7 is a simplified diagram showing processing means in a print server of the apparatus.

FIGS. 6 and 7 are simplified diagrams showing processing means in the MFP 1 and print server 2 respectively. As is shown in FIG. 6, the MFP 1 comprises a CPU 10, RAM 11, and hard disk 12 connected by a bus 13. The browser application is stored in the hard disk 12 and may be run on the MFP 1 using the RAM 11 and CPU 10 a conventional manner to perform the operations of the browser application and MFP 1 described above.

As explained earlier the hardware of the print server 2 is conventional. As shown in FIG. 7, the print server 2 includes a CPU 20, RAM 21, and hard disk 22 connected by a bus 23. The print management software is stored in the hard disk 22 and may be run on the print server 2 using the RAM 21 and CPU 20 a conventional manner to perform the operations of the print management software and print server described above.

This application claims priority from Great Britain Patent Application No. GB0707496.6 filed on Apr. 18, 2007, which is hereby incorporated by reference herein in its entirety.

What is claimed is:

1. An apparatus comprising:
a multi-function peripheral device for displaying a user interface; and
a computer configured to provide user interface information to the multi-function peripheral device, wherein:
the multi-function peripheral device is configured to allow a user to interact with a program on the computer via the displayed user interface,
to send to the computer a first identification number of the user interface currently loaded and
to send information about at least one input from the user in a case that a trigger event occurs, and
the computer checks whether or not the first identification number corresponds to a second identification number of a correct user interface and, if the first identification number does not correspond to the second identification number, sends correct user interface information to the multi-function peripheral device to allow the multi-function peripheral device to display a plurality of panes of the correct user interface to the user without receiving further user interface information from the computer, the user interface information being information of one of a layout and a structure of the plurality of panes, wherein
user interface information is not varied during a run time of the multi-function peripheral device, and is alterable by the computer, and
alteration to the user interface by the computer will trigger a download of the user interface information to the multi-function peripheral device after the run time is completed.

2. The apparatus according to claim 1, wherein the multi-function peripheral device is configured to send information to the computer using a synchronous protocol whereby the multi-function peripheral device waits for a response from the computer before responding to at least one trigger event.

3. The apparatus according to claim 1, wherein the multi-function peripheral device is configured to send information to the computer using an asynchronous protocol whereby the multi-function peripheral device responds to at least one trigger event before a response is received from the computer.

4. A computer for providing user interface information to a multi-function peripheral device, wherein the computer is configured to:
allow a user to interact with a program on the computer via a user interface displayed on the multi-function peripheral device,
receive from the multi-function peripheral device a first identification number of a user interface currently loaded on the multi-function peripheral device,
send from the multi-function peripheral device information to the computer about at least one input from the user in the case that a trigger event occurs, and
check whether or not the first identification number corresponds to a second identification number of a correct user interface, and
if the first identification number does not correspond to the second identification number, send to the multi-function peripheral device correct user interface information to allow the multi-function peripheral device to display a plurality of panes of the correct user interface to the user without receiving further information from the computer, the user interface information being information of one of a layout and a structure of the plurality of panes, wherein
user interface information is not varied during a run time of the multi-function peripheral device, and is alterable by the computer, and
alteration to the user interface by the computer will trigger a download of the user interface information to the multi-function peripheral device after the run time is completed.

5. A method for providing a user interface on a multi-function peripheral device to allow a user to interact with a program on the computer, comprising:
receiving from the multi-function peripheral device a first identification number of a user interface currently loaded on the multi-function peripheral device,
sending from the multi-function peripheral device information to the computer about at least one input from the user in the case that a trigger event occurs, and
checking whether or not the first identification number corresponds to a second identification number of a correct user interface, and
sending, if the first identification number does not correspond to the second identification number, correct user interface information from the computer to the multi-function peripheral device to allow the multi-function peripheral device to display a plurality of panes of the correct user interface to the user without receiving further information from the computer, the user interface information being information of one of a layout and a structure of the plurality of panes, wherein
user interface information is not varied during a run time of the multi-function peripheral device, and is alterable by the computer, and
alteration to the user interface by the computer will trigger a download of the user interface information to the multi-function peripheral device after the run time is completed.

6. A storage medium storing a program for providing a user interface on a multi-function peripheral device to allow a user to interact with a program on the computer based on user interface information from the computer, the program configured to cause the computer to perform a method comprising:

receiving from the multi-function peripheral device a first identification number of a user interface currently loaded on the multi-function peripheral device, sending from the multi-function peripheral device information to the computer about at least one input from the user in the case that a trigger event occurs, and checking whether or not the first identification number corresponds to a second identification number of a correct user interface, and sending, if the first identification number does not correspond to the second identification number, correct user interface information from the computer to the multi-function peripheral device to allow the multi-function peripheral device to display a plurality of panes of the correct user interface to the user without receiving further information from the computer, the user interface information being information of one of a layout and a structure of the plurality of panes, wherein user interface information is not varied during a run time of the multi-function peripheral device, and is alterable by the computer, and alteration to the user interface by the computer will trigger a download of the user interface information to the multi-function peripheral device after the run time is completed.

7. A multi-function peripheral device for displaying a user interface, wherein the multi-function peripheral device is configured to:

allow a user to interact with a program on a computer, send to the computer a first identification number of a user interface currently loaded on the multi-function peripheral device, receive, in a case that the first identification number does not correspond to a second identification number of the correct user interface, correct user interface information to allow the multi-function peripheral device to display a plurality of panes of the correct user interface to a user without receiving further user interface information from the computer, the user interface information being information of one of a layout and a structure of the plurality of panes, and send information to the computer about at least one input from the user in the case that a trigger event occurs, wherein user interface information is not varied during a run time of the multi-function peripheral device, and is alterable by the computer, and alteration to the user interface by the computer will trigger a download of the user interface information to the multi-function peripheral device after the run time is completed.

8. A method for providing multi-function peripheral device for displaying a user interface to allow a user to interact with a program on a computer based on user interface information from the computer, comprising:

sending to the computer a first identification number of a user interface currently loaded on the multi-function peripheral device, receiving, in a case that the first identification number does not correspond to a second identification number of the correct user interface, correct user interface information from the computer to allow the multi-function peripheral device to display a plurality of panes of the correct user interface to a user without receiving further user interface information from the computer, the user interface information being information of one of a layout and a structure of the plurality of panes, and sending information to the computer about at least one input from the user in the case that a trigger event occurs, wherein user interface information is not varied during a run time of the multi-function peripheral device, and is alterable by the computer, and alteration to the user interface by the computer will trigger a download of the user interface information to the multi-function peripheral device after the run time is completed.

9. A storage medium that stores a program for providing a user interface on a multi-function peripheral device to allow a user to interact with a program on a computer based on user interface information from the computer, the program configured to cause the multi-function peripheral device to perform a method comprising:

sending to the computer a first identification number of a user interface currently loaded on the multi-function peripheral device, receiving, in a case that the first identification number does not correspond to a second identification number of the correct user interface, correct user interface information from the computer to allow the multi-function peripheral device to display a plurality of panes of the correct user interface to a user without receiving further user interface information from the computer, the user interface information being information of one of a layout and a structure of the plurality of panes, and sending information to the computer about at least one input from the user in the case that a trigger event occurs, wherein user interface information is not varied during a run time of the multi-function peripheral device, and is alterable by the computer, and alteration to the user interface by the computer will trigger a download of the user interface information to the multi-function peripheral device after the run time is completed.

10. An apparatus comprising:

a multi-function peripheral device for displaying a user interface;

a computer device configured to provide user interface information to the multi-function peripheral device, wherein:

the multi-function peripheral device is configured to allow a user to interact with a program on the computer via the displayed user interface, the multi-function peripheral device is configured to send to the computer device a first identification number of the user interface currently loaded, the computer device checks whether or not the first identification number corresponds to a second identification number of a correct user interface and, if the first identification number does not correspond to the second identification number, sends correct user interface information to the multi-function peripheral device to allow the multi-function peripheral device to display a plurality of panes of the correct user interface to the user without receiving further user interface information from the computer device, the user interface information being information of one of a layout and a structure of the plurality of panes, wherein user interface information is not varied during a run time of the multi-function peripheral device, and is alterable by the computer device, and alteration to the user interface by the computer device will trigger a download of the user interface information to the multi-function peripheral device after the run time is completed.

* * * * *